3,296,002
REFRACTORY SHAPES
Weston Andrew Hare, Northfield, Wilmington, Del., assignor to E. I. du Pont de Nemours and Company, Wilmington, Del., a corporation of Delaware
No Drawing. Filed July 11, 1963, Ser. No. 294,266
5 Claims. (Cl. 106—40)

This invention relates to new and improved refractory products and a process for their production. More specifically it relates to the bonding of nonoxide refractory particles.

Structures of bonded silicon carbide are useful in many refractory areas and especially as saggers and kiln furniture in the ceramic industry. Such shapes have been made in the past by binding with a conventional material such as clay. A great disadvantage of such shapes is their lack of oxidation resistance. High temperatures weaken these structures and set up stresses leading to fracture.

It is an object of the present invention to provide structures of nonoxide refractories having improved strength and durability at both room temperature and elevated temperatures.

Another object is to provide a process for the binding of nonoxide refractories affording improved dimensional control of the structures during firing and use.

One object of the invention has been attained by a process comprising mixing from about 10 to 50%, preferably 15 to 40% by weight of particles of the group of aluminum and alloys thereof containing a major amount of aluminum, said particles passing through an 80-mesh screen, preferably with a fluxing agent in an amount of at least 0.2% based on the weight of the aluminum and from about 50 to 90% of a filler refractory at least half of which has a particle size of 140 mesh or smaller, the remainder being essentially smaller than 28 mesh, said refractory being selected from the group consisting of the carbides of aluminum, boron, silicon, titanium, and tungsten; the nitrides of aluminum, boron, titanium, uranium, and zirconium; and the borides of chromium, molybdenum, titanium, tungsten, and zirconium. Precursors and mixtures of and compounds containing the aforementioned refractory compounds can also be used. The mixture is shaped to give a porosity of at least 20% after removal of volatile material (as measured after heating at 500° C. until equilibrium is reached) and fired in an oxidizing atmosphere at a temperature between 600° C. and the melting point of the filler refractory for a period of time to oxidize at least 90% of the aluminum, the rate of heating being controlled so that the temperature of the shaped mixture does not exceed the ambient temperature by more than 100° C. (preferably 25° C.).

The shaped refractory resulting from the aforementioned process is a rigid structure in which the refractory particles are bonded. In a preferred body silicon carbide particles in the amount of from 35 to 83% are bonded by a porous in situ oxidized crystalline matrix of alumina and mullite. In general, the bond has a porosity of between 20 and 50% and is characterized by substantially uniformly distributed cells of 0.4 to 5 mils in diameter.

The preferred products of this invention have flexural strengths in excess of 5000 pounds per square inch and 3000 pounds per square inch at 25 and 1550° C. repectively. The preferred products are extremely resistant to oxidation in air at temperatures of use of from 1400° to 1600° C. and higher and show no significant change in dimensions or strength during such use.

The major amount of the refractory particles should have a particle size of 140 mesh and smaller. More preferably at least about 40% of the refractory should pass a 200-mesh screen. Preferred products are made from silicon carbide having a particle size that is 1.5 to 2.0 times the average particle size (or diameter) of the aluminum used. A portion of the refractory may react to form spinels, mullite, etc. or go into solid solution with the alumina that forms during oxidation.

Aluminum particles and particles of alloys of aluminum with other metals in which aluminum constitutes the major component may be used. The metal used is preferably clean and free from grease and oil. The particles should pass an 80-mesh sieve. The use of larger particles results in structures having a marked lower flexural strength.

Suitable fluxing agents are an oxide of a metal from the class consisting of the alkali metals, the alkaline earth metals, vanadium, chromium, molybdenum, tungsten, copper, silver, zinc, antimony, and bismuth, precursors of these oxides and hydroxides of the alkali metals. The oxides and hydroxides of the alkali metals, magnesium, strontium and barium are preferred due to their greater efficiency. The alkali metal compounds and particularly sodium silicate are most preferred.

Among suitable precursors of these materials may be mentioned the organic salts such as acetates, benzoates, etc., and inorganic salts as bisulfates, bisulfites, bromates, nitrates, silicates, sulfates, sulfites, thiosulfates, etc., of the recited metals. While not "per se" within the class of useful fluxing agents, these compounds do, under conditions of the reaction, yield compounds within the above defined class. In addition, trialkyl tin oxide and lead silicate ($PbSiO_3$) are also useful as fluxing agents.

The fluxing agent is calculated on the basis of the metal oxide that it forms in those cases where a metal oxide precursor is used. The metal oxide or hydroxide can vary in amount from 0.2 to 10% or more based on the total weight of the aluminum. Preferably from about 0.2 to 3% is used. Higher concentrations of fluxing agent may be employed but are generally avoided to prevent undue lowering of the melting point of the final structure and loss of strength at elevated temperatures.

Prior to heating the shaped metal aggregate in an oxidizing atmosphere, the surfaces of the metal particles are intimately contacted with a fluxing agent. The agent may be applied dry, in solution, as a gas or as a melt. The manipulative technique of contacting the metal surface with it is not critical. Thus it may be powdered or sprayed upon the metal, or the metal may be dipped in a solution of the agent or its melt or powder. It is conveniently done using a concentrated aqueous solution or slurry. The use of pressure and/or vacuum to assist in uniform and complete distribution of the agent over the particle surfaces is often advantageous. Furthermore, when using dilute solutions, the addition of a thickner such as sodium carboxy methyl cellulose may be advantageous. The fluxing agent may be mixed with the filler refractory and the metal shapes added to the mixture.

In some cases it is advantageous to add minor amounts of water, ethyl alcohol, ethylene glycol, acetone, solutions of carboxy methyl cellulose, rubber, gum arabic, polyvinyl alcohol, natural gums, glue and the like to increase the green strength of the shaped object. A self-bonding additive such as Sorel cement can also be used for this purpose. Preferably a material is used that will burn out under the firing conditions. From about 0.1% to about 2% binder is usually adequate.

The unfired mixture of metal, fluxing agent and filler refractory should be compacted during the final shaping process to afford a porosity (after removal of volatile materials) of between about 20% and 75% and preferably 20 to 40%. This can be attained by relatively high molding pressures and by selection of particle sizes of the filler refractory to afford the best packing.

The minimum porosity of about 20% is required for the entrance of oxygen into the interior of the body in order to completely oxidize the aluminum. The maximum porosity set out above is designed to permit the development of maximum strength. In some cases it may be desirable to add a fugitive substance such as napthalene, mold to an extremely low porosity level and then remove the fugitive substance before or during firing.

It is found that decreased porosity of the unfired shapes results in increased strength. However, if the unfired porosity is less than about 20% the aluminum tends to flow to the surface of the molded shape.

The dried "green" molded object is then heated in an oxidizing atmosphere such as air, oxygen or mixtures of oxygen and inert gases at a temperature of at least about 600° C. but below the ignition temperature of the system at the concentration of oxygen employed. The exact conditions for firing will depend upon the green porosity of the shaped object, the amount of metal, the amount and kind of fluxing agent and the temperature. These interactions and variations among them will be apparent to one skilled in the art. To make the best products, the above mentioned variables should be selected so that a spontaneous and rapid ignition does not take place, or a spontaneous and rapid reduction of the nonaluminum constituents does not occur. This is conveniently controlled by adjustments of the heating rate and/or flow of oxygen through the furnace as guided by a thermocouple included in a molded refractory mixture in the oven. In general, at least the first stages of oxidation should be carried out at a relatively low temperature. For example, a temperature of about 700° to 1050° C. for a period of about ½ to 48 hours can be used with as little as 0.1 to 3% of an alkali metal oxide or hydroxide. The less active fluxing agent such as MgO in the amount of 0.1 to 10% will require from 1 to 72 hours at temperatures of 1000° to 1350° C. or higher. It is preferred to heat at a relatively low temperature initially, until a stress bearing oxide film develops which holds the molded shape of the aggregate during subsequent further oxidation at a higher temperature. This sequence of steps minimizes pooling or the aggregation of molten metal which causes the formation of large voids and makes complete oxidation of the aluminum difficult or impossible.

The oxidation of the aluminum is for 90 to 99%+ complete in the final structure. Preferably the product contains less than 1% metallic aluminum.

In the following examples, porosities are calculated from the apparent density (weight of the body in air/mass volume of the body including opened and closed pores), and the density of the solid material as obtained by crushing the sample and determining the volume of the solids and their weight. The volume measurement is conveniently made on an air comparison pycnometer (model 930, made by Beckman Instruments, Inc. of Fullerton, California). As an approximation, the porosity may be calculated from the apparent density and the calculated density of the solid material in a body of known composition.

All seive measurements are made with U.S. Sieve Series.

Flexural strength is measured according to ASTM Standard 1958, Part 4, page 670, Text No. C293–57T with the use of a span width of 1 to 4 inches.

Example 1

A commercial grade of silicon carbide (99.5% SiC of 220 grit, i.e., about 220 mesh), 70 parts, is intimately mixed with 30 parts of aluminum powder (99.5% Al, 100% passes 100 mesh and 79% passes 325 mesh) and 10 parts of water. The damp mixture is molded in a 1″ x 3″ mold under a pressure of 10,000 pounds per square inch (p.s.i.). The green (unfired) block is air dried and then fired in an air atmosphere according to the following schedule with the time in hours after each temperature (° C.): 150° (4), 500° (2), 650° (10), 700° (2), 750° (8), 800° (6), 900° (6), 1000° (6), 1100° (6), 1200° (6), 1300° (6), and 1400° (24).

This procedure is repeated with the addition of varying amounts of sodium silicate to the water to provide $Na_2O$ fluxing agent. The temperature of the structure does not rise more than 25° above the temperature of the furnace during the firing.

Physical properties of the products are reported in Table I below as items a–e. The advantage of using an added fluxing agent are evident when the flexural and compressive strengths of items b–e are compared to item a (no added fluxing agent). The gain in weight upon firing indicates that the aluminum in all samples is oxidized to 95–100% of completion. All samples had a green (unfired) porosity of about 35%.

TABLE I

| Item | Aluminum, percent | Fluxing agent, percent of Al | Total molding force, pounds | Properties of Fired Product | | |
|---|---|---|---|---|---|---|
| | | | | Flexural strength | | Compressive strength |
| | | | | At 20° C. | At 1,550° C. | |
| a | 30 | 0.0 | 30,000 | 3,780 | 1,580 | 10,820 |
| b | 30 | 0.2 | 30,000 | 3,844 | 2,190 | 11,450 |
| c | 30 | 0.4 | 30,000 | 4,372 | 2,330 | 14,650 |
| d | 30 | 0.8 | 30,000 | 4,468 | 1,980 | 16,550 |
| e | 30 | 1.0 | 30,000 | 4,574 | 2,780 | 13,140 |

When the silicon carbide is replaced with silicon carbide of 30 grit (about 30 mesh) the fired products have flexural strengths at 20° C. as follows: 1556, 2308, 2888, 2996 and 2526 p.s.i. for 0, 0.4, 0.8, 1.5 and 2.0% sodium silicate (based on weight of aluminum) respectively. These results indicate the substantial and unexpected advantages obtained with the use of fine ground silicon carbide.

Example 2

Mixtures of 220-mesh silicon carbide and aluminum powder with different amounts of aluminum and 0.8% of sodium silicate (based on aluminum) are made and fired according to the procedure of Example 1. The following results are obtained:

TABLE II

| Item | Percent Aluminum | Flexural Strength | |
|---|---|---|---|
| | | At 20° C. | At 1,550° C. |
| a | 0 | 1,764 | |
| b | 20 | 2,295 | 1,270 |
| c | 30 | 4,372 | 2,330 |

The use of 20% aluminum and 80% of 30-grit silicon carbide with 0.8% sodium silicate gives a product with a flexural strength at 20° C. of 1444 p.s.i. compared with a flexural strength of less than 500 p.s.i. for the 30-mesh silicon carbide alone.

Weight gains on the samples containing no aluminum indicate that about 5-6% of the silicon carbide is oxidized during the firing.

EXAMPLE 3

Portions of a mixture containing 30 parts aluminum powder, 70 parts silicon carbide (220 grit) and 10 parts of an aqueous solution of sodium silicate (equivalent to 0.4% $Na_2O$ of weight of aluminum) are molded as different pressures, dried and fired according to Example 1. The porosities of the dried and unfired shapes vary from about 35% for item $a$ to 25% for item $d$. Physical properites of the fired structure are given as items $a$–$d$ in Table III below.

TABLE III

| Item | Aluminum, percent | Fluxing agent, percent of Al | Total molding force, pounds | Flexural strength | | Compressive strength |
|---|---|---|---|---|---|---|
| | | | | At 20° C. | At 1,550° C. | |
| a | 30 | 0.4 | 30,000 | 4,372 | 2,330 | 14,650 |
| b | 30 | 0.4 | 35,000 | 4,614 | 1,380 | 15,079 |
| c | 30 | 0.4 | 40,000 | 5,082 | 1,520 | 20,960 |
| d | 30 | 0.4 | 45,000 | 5,448 | 5,180 | 21,200 |

Weight gains on these items indicate that the aluminum is oxidized about 100%. X-ray diffraction analysis shows the presence of major amounts of SiC and alpha alumina with much lesser amounts of mullite and $SiO_2$ and no indication of metallic aluminum.

The samples show no measurable change in dimensions during firing.

Samples of the above fired products undergo no further oxidation upon being reheated at 1400° C. for 48 hours as evidenced by no change in weight and the oxygen content of the furnace. The samples do not show any expansion or shrinkage as a result of the reheating.

Example 4

A mixture of 15 parts of aluminum powder of Example 1 and 42.5 parts of 60-mesh SiC and 42.5 parts of 220-mesh SiC, 2.5 parts of sodium acetate and 12.5 parts dilute rubber cement was pressed at 5000 p.s.i., dried and fired as in Example 1. A 3% volume shrinkage occurred and 100% of the aluminum was converted to oxide. The flex strength at 20° C. was 5950 p.s.i.

What is claimed is:

1. A method for making an improved refractory product comprising mixing from about 10–50% by weight of particles of the group consisting of aluminum and alloys thereof containing a major amount of aluminum, said particles passing through an 80-mesh screen, with from about 50–90% by weight of refractory particles at least half of which pass through a 140-mesh screen, said particles being selected from the group consisting of the carbides of aluminum, boron, silicon, titanium, and tungsten, the nitrides of aluminum, boron, titanium, uranium and silicon, and the borides of chromium, molybdenum, titanium, tungsten and silicon, forming the particles into a body having a porosity of at least 20% after removal of volatile material, and firing the body in an oxidizing atmosphere at a temperature between 600° C. and the melting point of the refractory for a period of time sufficient to oxidize at least 90% of the aluminum, the rate of heating being controlled so that the temperature of the shaped mixture does not exceed the ambient temperature by more than 100° C.

2. The process of claim 1 wherein the refractory particles are silicon carbide.

3. The process of claim 1 wherein at least 0.2% by weight of a fluxing agent based on the aluminum is added to the mix prior to firing.

4. The process of claim 3 wherein the flux is $Na_2O$.

5. A rigid refractory structure having from 35–83% by weight of silicon carbide particles at least half of which pass through a 140-mesh screen, said particles being bonded by a porous in situ oxidize crystalline matrix of alumina and mullite, said bonding material having a porosity of between 20 and 50% and having substantially uniformly distributed therethrough cells of from 0.4 to 5 mils in diameter.

References Cited by the Examiner
UNITED STATES PATENTS

| | | | |
|---|---|---|---|
| 1,894,685 | 1/1933 | Hediger | 106–44 |
| 2,641,044 | 1/1953 | Bearer | 106–44 |
| 2,741,822 | 4/1956 | Udy | 106—65 |
| 3,151,944 | 10/1964 | Adlassnig | 106—44 |
| 3,220,860 | 11/1965 | Robiette et al. | 106—44 |

TOBIAS E. LEVOW, *Primary Examiner.*

H. M. McCARTHY, *Assistant Examiner.*